United States Patent
Ninomiya et al.

(10) Patent No.: US 7,337,694 B2
(45) Date of Patent: Mar. 4, 2008

(54) FOOT-OPERATED PARKING BRAKE DEVICE FOR VEHICLES

(75) Inventors: Tomiaki Ninomiya, Kariya (JP); Kenichi Kobayashi, Nagoya (JP); Mitsunari Kawahata, Anjo (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 307 days.

(21) Appl. No.: 11/245,038

(22) Filed: Oct. 7, 2005

(65) Prior Publication Data

US 2006/0075845 A1   Apr. 13, 2006

(30) Foreign Application Priority Data

Oct. 13, 2004 (JP) .............................. 2004-299354
Sep. 20, 2005 (JP) .............................. 2005-271390

(51) Int. Cl.
G05F 5/06 (2006.01)

(52) U.S. Cl. .......................................... 74/542; 74/535

(58) Field of Classification Search ................. 74/527, 74/529, 533, 535, 536, 539, 542, 575, 577 R, 74/577 S, 577 SF, 577 M
See application file for complete search history.

(56) References Cited

U.S. PATENT DOCUMENTS 3,693,472 A * 9/1972 Hirst et al. .................... 74/518
4,519,270 A * 5/1985 Kawaguchi et al. .......... 74/535
5,775,174 A * 7/1998 Kanbe et al. .................. 74/542
6,736,025 B2 * 5/2004 Kanbe .......................... 74/535
2003/0094069 A1 * 5/2003 Kanbe .......................... 74/560

FOREIGN PATENT DOCUMENTS

JP   2004-182135   7/2004

* cited by examiner

*Primary Examiner*—Chong H Kim
(74) *Attorney, Agent, or Firm*—Buchanan Ingersoll & Rooney PC

(57) ABSTRACT

A foot-operated parking brake device for vehicles is provided with a shock absorbing member 60 on which a predetermined portion, e.g., an engaging claw 32d, except for a pole abutting portion 32e of a pole 32 is brought into abutting when a pedal arm 20 is moved from an original position to an abutting position where the engaging claw 32d of the pole 32 is brought into abutting on ratchet teeth 31a. An abutting surface 61 of the shock absorbing member 60 is formed to bring a lock mechanism 30 into the first state at least before the pedal arm 20 reaches the abutting position and to form a space between the pole abutting portion 32e and a release lever abutting portion 33a until the lock mechanism 30 is brought into the first state. Thus, immediately before the pole abutting portion 32e and the release lever abutting portion 33a are brought into collision by being pivoted by the urging force of a spring 34, the pivot movement of the pole is restrained, so that the pole abutting portion 32e and the release lever abutting portion 33a can be prevented from generating a collision noise.

6 Claims, 7 Drawing Sheets

Movement of Pedal Arm

FOOT-OPERATED PARKING BRAKE DEVICE FOR VEHICLES

This application claims priority under 35 U.S.C. 119 with respect to Japanese Application No. 2004-299354 filed on Oct. 13, 2004.

BACKGROUND OF THE INVENTION

1. Field of the Invention

The present invention relates to a foot-operated parking brake device for vehicles such as motor car and in particular, relates to a foot-operated parking brake device for vehicles which is capable of releasing the locking of a parking brake by doing the same manipulation as done for locking the parking brake.

2. Discussion of the Related Art

As foot-operated parking brake devices for vehicles of this kind, there has been known one which is described in Japanese unexamined, published patent application No. 2004-182135. The known device is composed of a pedal arm 20 which is attached at its one end to a mounting bracket 11 secured to a vehicle body, to be pivotably within a vertical plane and which has a parking brake control cable 40 connected to the side of said one end and a pedal pad attached to the other end thereof, and a rock mechanism 30 which operates to lock the pedal arm 20 when the same is stepped on and to release the locking when the pedal arm 20 is stepped on again. The same reference numerals as used in the aforementioned Japanese application are used in this section hereof.

The lock mechanism 30 is composed of plural ratchet teeth 31a which are provided on the mounting bracket 11 to align along an arc having a center coaxial with the pivot axis of a pedal arm 20, a pole 32 attached to the pedal arm 20 to be pivotably and slidable and having an engaging claw (ratchet claw) 32d disengage ably engaged with the ratchet teeth 31a, a release lever 33 attached to the pedal arm 20 to be pivotably in approximately coaxial alignment with the pole 32, a spring 34 for urging the pole 32 and the release lever 33 to pivot in opposite directions with each other, a pole pivot limiting portion (right side wall) 22b and a release lever pivot limiting portion (left side wall) 22a for respectively limiting pivot movements of the pole 32 and the release lever 33, and a pole abutting portion (engaging protrusion) 32e and a release lever abutting portion (engaging protrusion) 33e formed on the pole 32 and the release lever 33 for respectively limiting pivot movements of the pole 32 and the release lever 33 upon abutting on each other.

Before the pedal arm 20 is locked, the lock mechanism 30 as constructed above is in a first state (refer to FIG. 3) that the pole 32 and the release lever 33 are kept in abutting on each other not to pivot relatively as a result being pivoted by the urging force of the spring 34 being in the first position in pivot directions which make the pole abutting portion 32e and the release lever abutting portion 33a come close to each other and that the engaging claw 32d of the pole 32 is engage able with the ratchet teeth 31a. After the stepping force on the pedal arm 20 is released subsequently of the locking operation, the lock mechanism 30 is in a second state (refer to FIG. 6) that the pole 32 and the release lever 33 are kept in abutting respectively on the pole pivot limiting portion 22b and the release lever pivot limiting portion 22a not to pivot relatively as a result of being pivoted by the urging force of the spring 34 being in the second position in pivot directions which make the pole abutting portion 32e and the release lever abutting portion 33a go away from each other and that the engaging claw 32d of the pole 32 is kept released from the state in which the engaging claw 32d of the pole 32 is engage able with the ratchet teeth 31a.

When the driver steps on the pedal pad 25 again to release the locking of the pedal arm 20, the pedal arm 20 is slightly pivoted counterclockwise from the state shown in FIG. 5. As a result, the engaging claw 32d is disengaged from the ratchet teeth 31a, and the pole 32 is pivoted counterclockwise by the urging force of the spring 34 to be stopped upon abutting on the right side wall 22b (refer to FIG. 6). Then, as the driver relaxes the stepping force being exerted on the pedal pad 25, the pedal arm 20 is pivoted by the urging force of a return spring to return from an operating position toward an original position (the state shown in FIG. 1) being an inoperative position. In the beginning of the return motion, since the lock mechanism 30 is in the second state, the pole 32 and the release lever 33 have been pivoted by the urging force of the spring 34 respectively counterclockwise and clockwise. When the abutting protrusion 33b of the release lever 33 comes into abutting on the abutting portion 14 of the mounting bracket 11, the release lever 33 is pivoted counterclockwise against the urging force of the spring 34. When the further pivot movement of the pedal arm 20 causes the release lever 33 to pivot further, the spring 34 is turned over to the first position to return the lock mechanism 30 to the first state (refer to FIG. 3).

In the foregoing foot-operated parking brake device for vehicles, the spring 34 is also returned from the second position to the first position when the lock mechanism 30 is returned from the second state to the first state to release the pedal arm 20 being locked. Before this returning, the pole 32 and the release lever 33 remaining in the second state have been pivoted by the urging force of the spring 34 in the second position respectively counterclockwise and clockwise, and the pole abutting portion 32e and the release lever abutting portion 33a have been separated from each other with the space therebetween. However, with the returning of the spring 34 to the first position, the pole 32 and the release lever 33 are pivoted by the urging force of the spring 34 being in the first position respectively clockwise and counterclockwise, whereby the pole abutting portion 32e and the release lever abutting portion 33a having been separated so far come close with great force. This gives rise to a problem that a large collision noise is generated at the moment of such collision.

SUMMARY OF THE INVENTION

Accordingly, it is a primary object of the present invention to provide an improved foot-operated parking brake device for vehicles which is capable of restricting the pivot movement of a pole immediately before a pole abutting portion and a release lever abutting portion being in separation are brought into collision by being pivoted by the urging force of a spring, so that the pole abutting portion and the release lever abutting portion can be prevented from generating a collision noise.

Briefly, according to the present invention, there is provided a foot-operated parking brake device for vehicles having a pedal arm attached at one end thereof to a mounting bracket secured to a vehicle body to be pivotably in a vertical plane, the pedal arm being connected at the side of the one end to a parking brake control cable and having a pedal pad attached to the other end thereof; and a lock mechanism for locking the pedal arm when the same is stepped and for releasing the locking of the pedal arm when the same is stepped again. The lock mechanism comprises plural ratchet teeth provided on either one of the mounting bracket and the pedal arm to align along an arc having a center coaxial with a pivot axis of the pedal arm; a pole attached to the other of the mounting bracket and the pedal arm to be pivotably and slidable and having an engaging claw disengage ably engaged with the ratchet teeth; a release lever attached to the other of the mounting bracket and the pedal arm to be approximately coaxial and pivotably; a spring for urging the pole and the release lever to pivot in mutually opposite directions; a pole pivot limiting portion and a release lever pivot limiting portion for respectively limiting pivot movements of the pole and the release lever; and a pole abutting portion and a release lever abutting portion formed on the pole and the release lever for respectively limiting pivot movements of the pole and the release lever upon abutting on each other. Before the pedal arm is locked, the lock mechanism is in a first state that the pole and the release lever are kept in abutting on each other not to pivot relatively as a result of being pivoted by the urging force of the spring being in a first position in pivot directions which make the pole abutting portion and the release lever abutting portion come close to each other, thereby to bring the pole abutting portion and the release lever abutting portion into abutting on each other, the spring in the first position urging the pole and the release lever to pivot in the pivot directions which make the pole abutting portion and the release lever abutting portion come close to each other, and that the engaging claw of the pole is kept engage able with the ratchet teeth. After the locking of the pedal arm is released, the lock mechanism is in a second state that the pole and the release lever are kept not to pivot relatively as a result of being pivoted by the urging force of the spring being in a second direction in pivot directions which make the pole abutting portion and the release lever abutting portion go away from each other, thereby to bring the pole and the release into abutting respectively on the pole pivot limiting portion and the release lever pivot limiting portion, the spring in the second position urging the pole and the release lever to pivot in the pivot directions which make the pole abutting portion and the release lever abutting portion go away from each other, and that the engaging claw of the pole is released from the state in which the engaging claw of the pole is engage able with the ratchet teeth. There is further provided a shock absorbing member on which a predetermined portion except for the pole abutting portion of the pole is brought into abutting when the pedal arm is moved from an original position where the pedal arm is in abutting on a pedal arm pivot limiting portion without being stepped, to an abutting position where the engaging claw of the pole is brought into abutting on the ratchet teeth. An abutting surface of the shock absorbing member is formed to bring the lock mechanism into the first state at least before the pedal arm reaches the abutting position and to form a space between the pole abutting portion and the release lever abutting portion until the lock mechanism is brought into the first state.

With this construction, the spring is also returned from the second position to the first position when the lock mechanism is returned from the second state to the first state to unlock the pedal arm being locked. Before this returning, the pole and the release lever remaining in the second state have been pivoted by the urging force of the spring being in the second position in the pivot directions to make the pole abutting portion and the release lever abutting portion separate from each other, and thus, the pole abutting portion and the release lever abutting portion have been separated with the space therebetween. However, with the returning of the spring to the first position, the pole and the release lever are pivoted by the urging force of the spring being in the first position in the pivot directions to make the pole abutting portion and the release lever abutting portion come close to each other, and thus, the pole abutting portion and the release lever abutting portion having been separated so far come close with great force. At this moment, the engaging claw of the pole which is another part different from the pole abutting portion comes into abutting on the shock absorbing member with the shock being absorbed. The abutting surface of the shock absorbing member is formed to bring the lock mechanism into the first state at least before the pedal arm reaches, from the original position, the abutting position where the engaging claw of the pole is brought into abutting on the ratchet teeth, and to form the space between the pole abutting portion and the release lever abutting portion until the lock mechanism is brought into the first state. Therefore, by restricting the pivot movement of the pole immediately before the pole abutting portion and the release lever abutting portion having been in separation are brought into collision by being pivoted by the urging force of the spring, the pole abutting portion and the release lever abutting portion can be prevented from generating the collision noise, so that it can be realized to diminish the unnecessary noise in the manipulation of the pedal arm.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which:

FIG. 3 is another operation explanatory view showing the pedal arm in the course of being stepped on;

DETAILED DESCRIPTION OF THE PREFERRED EMBODIMENT

Figure 1:
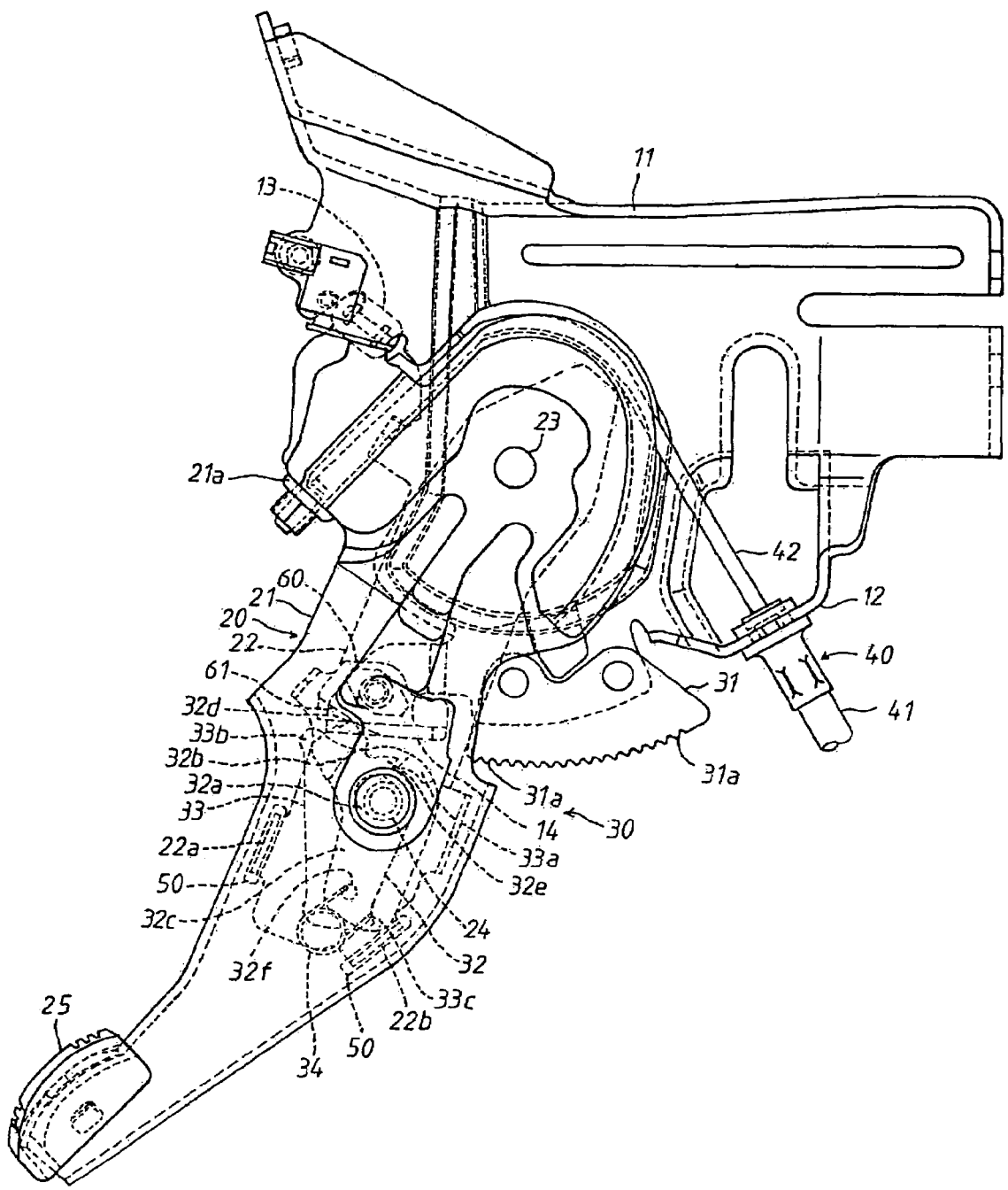
FIG. 1 is a side view of a foot-operated parking brake device for vehicles in one embodiment according to the present invention.

Hereafter, description will be made regarding a foot-operated parking brake device for vehicles in one embodiment according to the present invention. FIG. 1 is a side view of the foot-operated parking brake device for vehicles. The foot-operated parking brake device for vehicles is provided with a pedal arm 20 which is attached at its upper end to a mounting bracket 11 secured to a vehicle body (not shown), to be pivotably within a vertical plane, and a lock mechanism 30 which operates to lock the pedal arm 20 when the same is stepped on and to release the locking when the pedal arm 20 is stepped on again.

As shown in FIG. 1, the pedal arm 20 is composed of a main pedal arm 21 and a sub-pedal arm 22, and upper ends of both pedal arms 21, 22 are supported by the mounting bracket 11 to be bodily pivotably about a first shaft pin 23. The lower end of the sub-pedal arm 22 is connected by means of a second shaft pin 24 to an intermediate portion of the main pedal arm 21. A brake cable 40 is provided with an end of its outer tube 41 being secured to an attaching portion 12 of the mounting bracket 11. An inner cable 42 of the brake cable 40 is arranged to go along an upper circumferential edge portion of the main pedal arm 21 and is secured at its one end to an attaching portion 21a of the main pedal arm 21. Further, the main pedal arm 21 has a pedal pad 25 attached to a lower end thereof. When the driver steps the pedal pad 25, the pedal arm 20 is pivoted counterclockwise as viewed in FIG. 1 to draw the inner cable 42, whereby a brake mechanism (not shown) operates.

The main pedal arm 21 is urged by a return spring (not shown) to be pivoted clockwise as viewed in FIG. 1. When not operating the brake mechanism, the main pedal arm 21 is kept in abutting on a stop 13 provided on the mounting bracket 11 thereby to be restricted from being further pivoted clockwise (refer to FIG. 1).

As shown mainly in FIG. 1, the lock mechanism 30 is composed of a ratchet plate 31 attached to the mounting bracket 11, a pole 32 and a release lever 33 each pivotably provided on the pedal arm 20, and a spring (torsion spring) 34 for urging the pole 32 and the release lever 33 to pivot in opposite directions with each other. The ratchet plate 31 is secured to a part under the first shaft pin 23 of the mounting bracket 11, and numerous ratchet teeth are formed on a lower edge of the ratchet plate 31 to align along an arc having the center coaxial with the first shaft pin 23.

The pole 32 and the release lever 33 are supported to be pivotably about the second shaft pin 24 connecting the main pedal arm 21 and the sub-pedal arm 22 together. As shown mainly in FIG. 2, the pole 32 is carried on the second shaft pin 24 through an elongate hole 32a which extends in the pivot direction of the pedal arm 20, so that the pole 32 is slidable on the lengthwise direction of the elongate hole 32a. The pole 32 is provided with a short arm 32b and a long arm 32c which extend from the elongate hole 32a upward and downward respectively. A ratchet claw (engaging claw) 32d which is disengage ably engaged with the latchet teeth 31ais formed at an end of the short arm 32b, while a pole abutting portion 32e engage able with a release lever abutting portion 33a is protruded from a root portion of the short arm 32b. The long arm 32c is provided at its end with a hook hole 32f engaging one end of the spring 34.

The release lever 33 is formed to take a vertically elongated rectangular shape and is carried at its upper end portion to be pivotably about the second shaft pin 24. At this upper end portion of the release lever 33, the aforementioned release lever abutting portion 33a is protruded, and an abutting protrusion 33b which is brought into abutting on a spring returning portion 14 of the mounting bracket 11 is formed to extend in a slantingly upward direction. The release lever 33 is provided at its lower end portion with a hook hole 33c engaging the other end of the spring 34. The spring returning portion 14 is provided for causing the release lever 33 to pivot upon abutting thereon to return the spring 34 from a second position to a first position through the pivot movement thereof.

Figure 7:
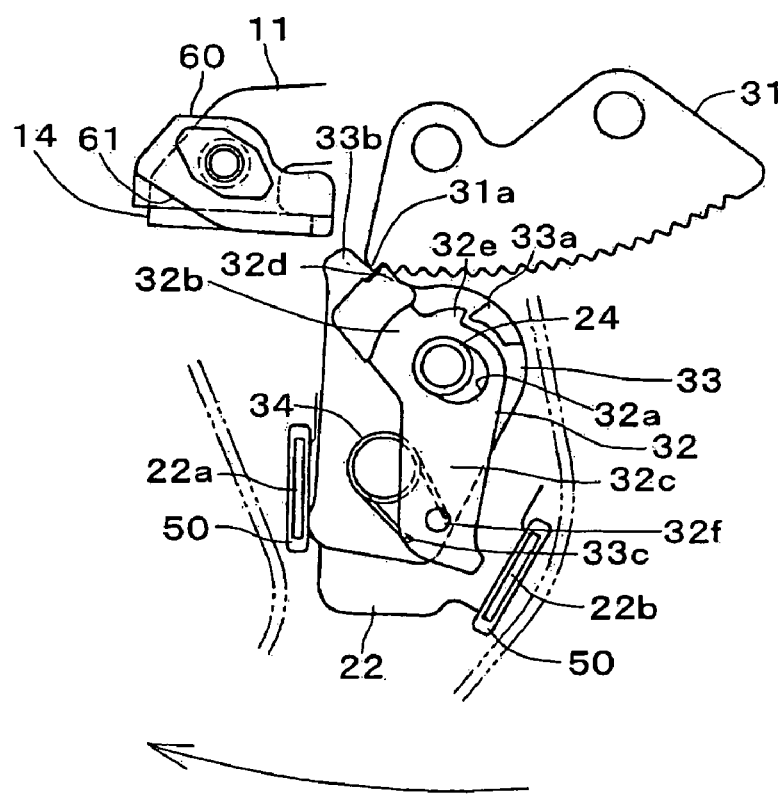
FIG. 7 is another operation explanatory view showing the parking brake device shown in FIG. 1 in a locking state.
Figure 8:
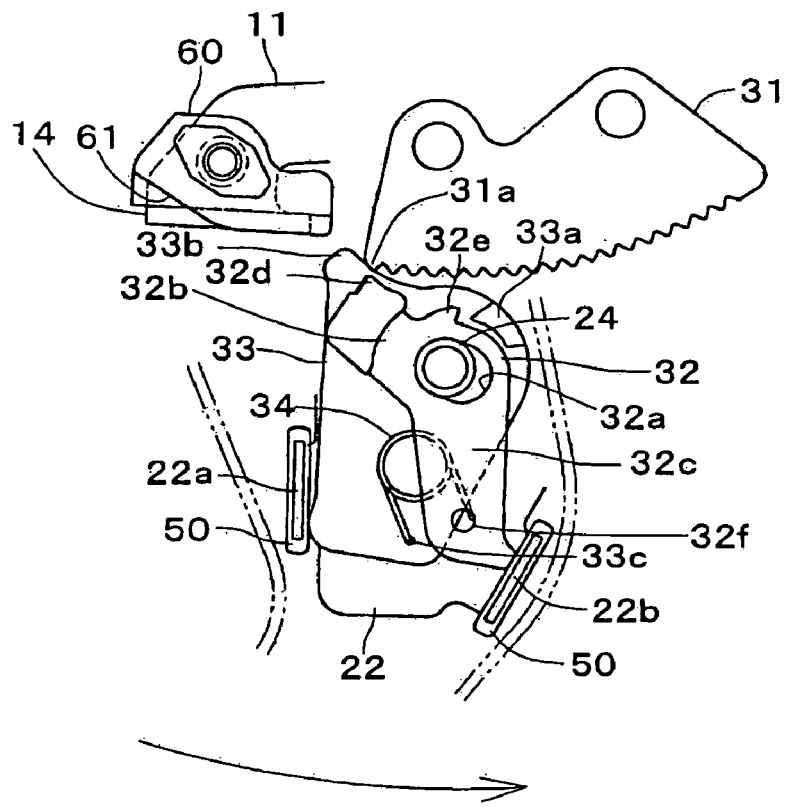
FIG. 8 is another operation explanatory view showing the parking brake device is being released from the locking state shown in FIG. 7.
Figure 9:
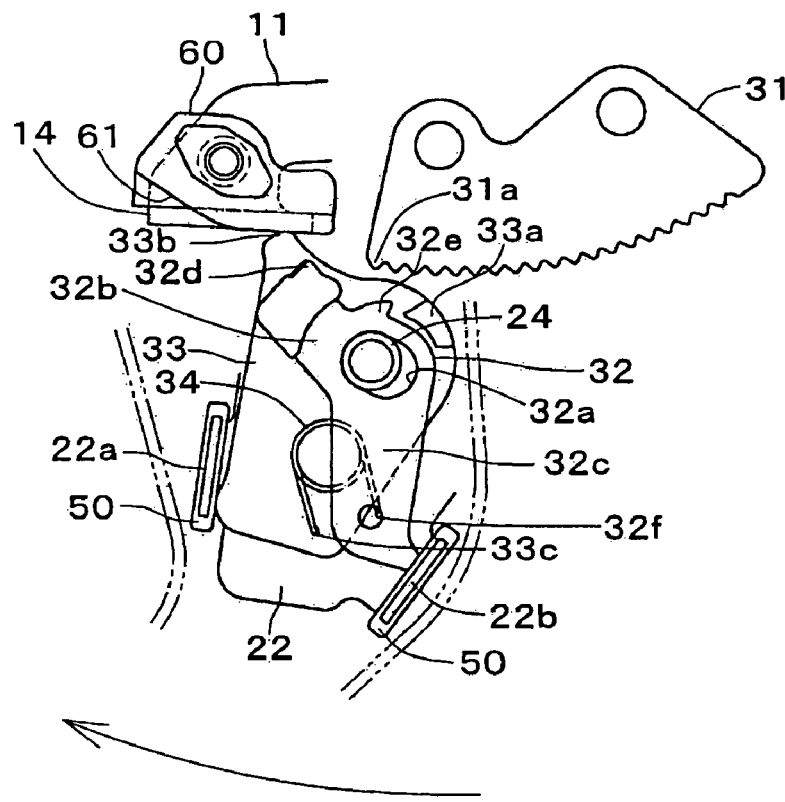
FIG. 9 is another operation explanatory view showing the state that an abutting protrusion of a release lever shown in FIG. 1 is abutting on a spring return portion.
Figure 10:
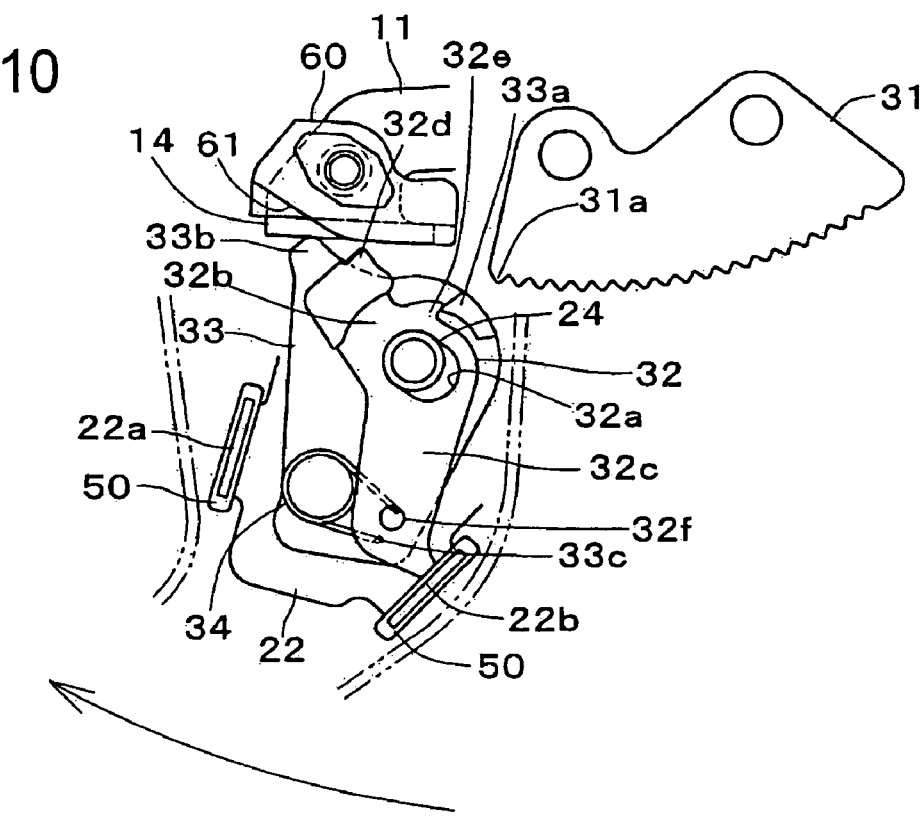
FIG. 10 is another operation explanatory view showing the state that a spring is in the course of being returned from a second position shown in FIG. 9 to a first position.
Figure 11:
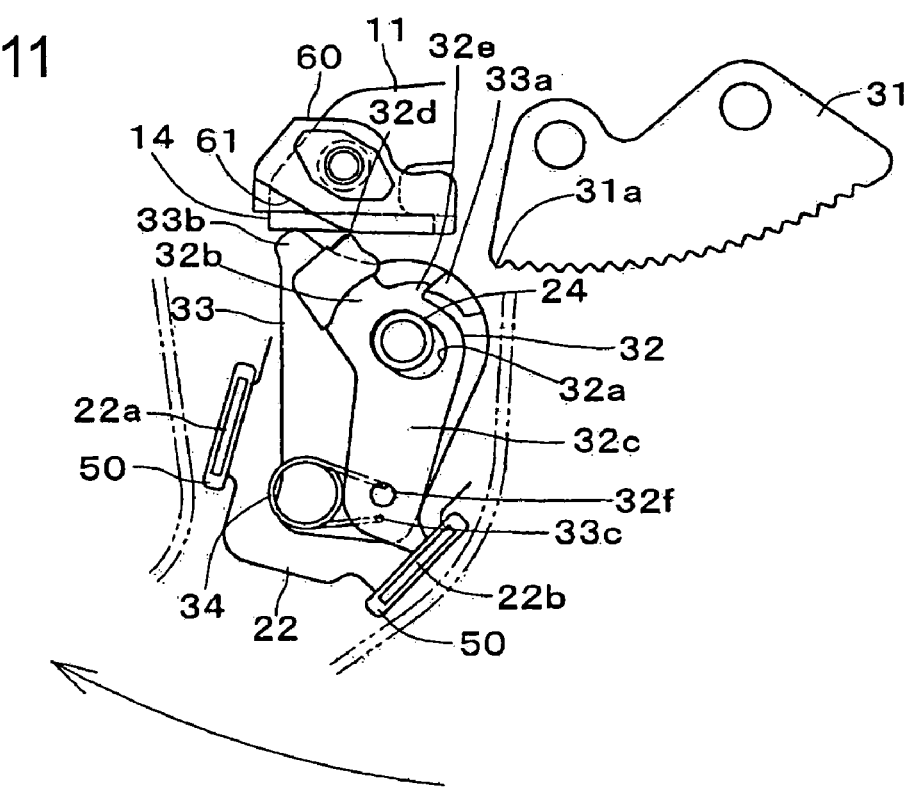
FIG. 11 is another operation explanatory view showing the state that a spring is in the course of being returned from the second position shown in FIG. 9 to the first position.

The first and second positions indicate different positions the spring 34 takes relative to the pole 32 and the release lever 33. The first position is the position where the spring 34 is urging the pole 32 and the release lever 33 to pivot in pivot directions which make the pole abutting portion 32e and the release lever abutting portion 33a come close to each other, as shown in FIGS. 2 to 6, 12 and 13. On the other hand, the second position is the position where the spring 34 is urging the pole 32 and the release lever 33 to pivot in pivot directions which make the pole abutting portion 32e and the release lever abutting portion 33a go away or separate from each other, as shown in FIGS. 7 to 9.

As shown mainly in FIG. 1, the lower end portion of the sub-pedal arm 22 constituting the pedal arm 20 is formed to be a U-letter shape in cross-section and is provided with plate-like left and right side walls 22a, 22b constituting the lock mechanism 30. The left and right side walls 22a, 22b are arranged at the both sides in the pivot direction of the pole 32 and the release lever 33 to limit the pivot ends of the pole 32 and the release lever 33. Cover members 50 each of which is formed with a soft elastic material (e.g., rubber) to take a bag shape respectively cover the left and right side walls 22a, 22b. The cover members 50 respectively cover the abutting portions of the left and right side walls 22a, 22b on which the pole 32 and the release lever 33 are brought into abutting. In the present embodiment, the left side wall 22a serves as a release lever pivot limiting portion for limiting the clockwise pivot movement of the release lever 33, whereas the right side wall 22b serves as a pole pivot limiting portion and a release lever pivot limiting portion which respectively limit the counterclockwise pivot movements of the pole 32 and the release lever 33.

The aforementioned lock mechanism 30 is in a first state before the pedal arm 20 is locked (refer to FIGS. 3 to 6). In the first state, the pole 32 and the release lever 33 are kept in abutting on each other not to pivot relatively as a result of being pivoted by the urging force of the spring 34 being in the first position in pivot directions which make the pole abutting portion 32e and the release lever abutting portion 33a come close to each other, that is, as a result that the pole 32 and the release lever 33 are pivoted respectively clockwise and counterclockwise, and the engaging claw 32d of the pole 32 is engage able with the ratchet teeth 31a. Further, the lock mechanism 30 is in a second state after the locking of the pedal arm 20 is released (refer to FIGS. 8 and 9). In the second state, the pole 32 and the release lever 33 are kept in abutting respectively on the right side wall (pole pivot limiting portion) 22*b* and the left side wall (release lever pivot limiting portion) 22*a* not to pivot relatively as a result of being pivoted by the urging force of the spring 34 being in the second position in pivot directions which make the pole abutting portion 32*e* and the release lever abutting portion 33*a* go away or separate from each other, that is, as a result that the pole 32 and the release lever 33 are pivoted respectively counterclockwise and clockwise, and the engaging claw 32*d* of the pole 32 is kept released from the state in which the engaging claw 32*d* of the pole 32 is engageable with the ratchet teeth 31*a*.

The foot-operated parking brake device for vehicles as constructed above is provided with a shock absorbing member 60 on which a predetermined portion (the engaging claw 32*d* in this embodiment) except for the pole abutting portion 32*e* of the pole 32 is brought into abutting when the pedal arm 20 is moved from the original position (refer to FIGS. 1 and 2) to an abutting position (refer to FIG. 4) where the engaging claw 32*d* of the pole 32 is abutting on the ratchet teeth 31*a*. The shock absorbing member 60 is attached to be close to a portion where the spring returning portion 14 of the mounting bracket 11 is formed. An abutting surface 61 of the shock absorbing member 60 is formed to bring the lock mechanism 30 into the first state at least before the pedal arm 20 reaches the abutting position and to provide a space between the pole abutting portion 32*e* and the release lever abutting portion 33*a* until the lock mechanism 30 is brought into the first state.

It is to be noted that when in the original position, the pedal arm 20 is not being stepped on and is fixedly positioned by abutting on the stop 13 serving as a pedal arm pivot limiting portion.

Further, the shock absorbing member 60 is bodily made of a material (e.g., rubber or resin) which is not elastically deformed beyond an amount to be required. Thus, it can be realized to diminish an abutting noise which may be generated as the pole 32 comes into abutting on the shock absorbing member 60, so that there can be reduced an unnecessary noise during the manipulation of the pedal arm 20. Further, it can be suppressed as much as possible that the elastic deformation beyond the required amount of the shock absorbing member 60 causes the pole abutting portion 32*e* to come into collision with the release lever abutting portion 33*a*. In a modified form, the shock absorbing member 60 may be composed of a body member made of a metal material and a plate-like shock absorbing part which is attached at least to a lateral surface of the body member corresponding to the abutting surface 61. In another modified form, the body member may have fitted thereon a belt-like (or, bag-like) shock absorbing part instead of the plate-like shock absorbing part.

Further, it is preferable that the engaging claw 32*d* serving as the predetermined portion of the pole 32 comes into abutting on the shock absorbing member 60 subsequent to the time point when the spring 34 is returned from the second position to the first position.

Figure 2:
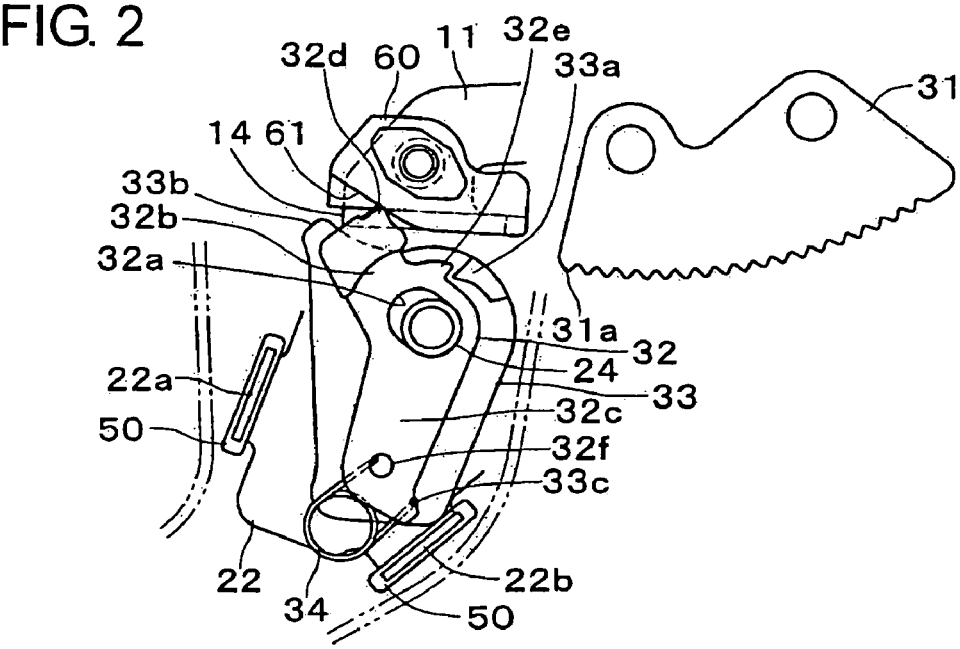
FIG. 2 is an operation explanatory view showing the parking brake device shown in FIG. 1 in a locking release state, that is, the state that the pedal arm is in an original position thereof.
Figure 3:
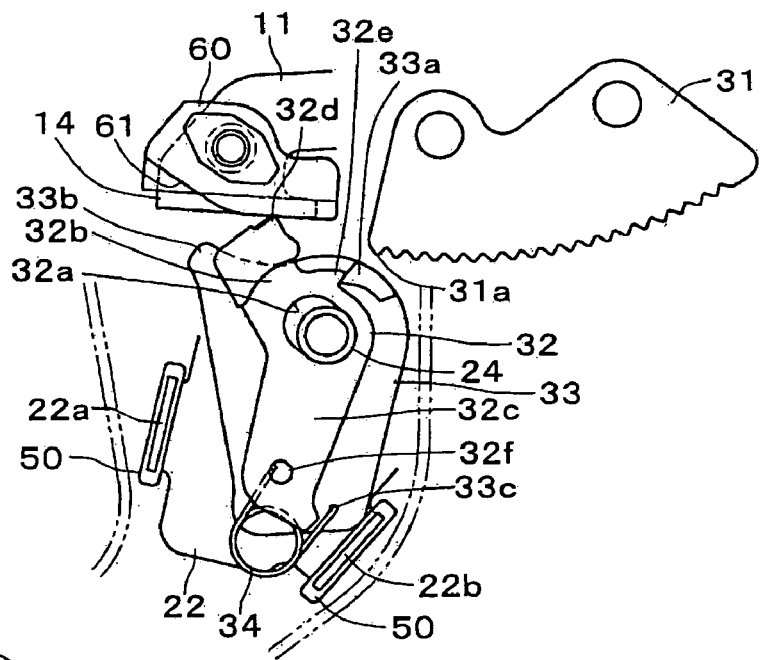

The operation of the foot-operated parking brake device for vehicles as constructed above will be described with reference to FIGS. 2 through 13. FIG. 2 shows the state that the locking of the parking brake has been released, namely the state that the pedal arm 20 remains in the original position without being not stepped on. In this state, the spring 34 urges the pole 32 and the release lever 33 to pivot respectively clockwise and counterclockwise. Further, the engaging claw 32*d* of the pole 32 is in abutting on the abutting surface 61 of the shock absorbing member 60. The pole 32 in abutting on the shock absorbing member 60 is prevented from pivoting clockwise. In addition, since the lock mechanism 30 in a state before being brought into the first state, the space is provided between the pole abutting portion 32*e* and the release lever abutting portion 33*a*. Having been pivoted counterclockwise by the urging force of the spring 34, the release lever 33 is prevented from pivoting with a lower end thereof being in abutting on the right side wall 22*b*. Furthermore, since the pole 32 has been pivoted by the urging force of the spring 34 about a fulcrum made on a point where the pole 32 abuts on the abutting surface 61, the pole 32 is positioned to the first slide position to bring the right end of the elongate hole 32*a* into contact with the second shaft pin 24.

When the driver steps on the pedal pad 25, the pedal arm 20 is pivoted counterclockwise about the first shaft pin 23 from the original position. As a result, the engaging claw 32*d* of the pole 32 is moved along the abutting surface 61 of the shock absorbing member 60, and the pole 32 is pivoted clockwise to make smaller the space between the pole abutting portion 32*e* and the release lever abutting portion 33*a* until the pole abutting portion 32*e* and the release lever abutting portion 33*a* come into abutting finally (refer to FIG. 3). Thus, the lock mechanism 30 is brought into the first state, and this state is kept until the engaging claw 32*d* of the pole 32 is brought into abutting on the ratchet teeth 31*a* of the ratchet plate 31.

Figure 4:
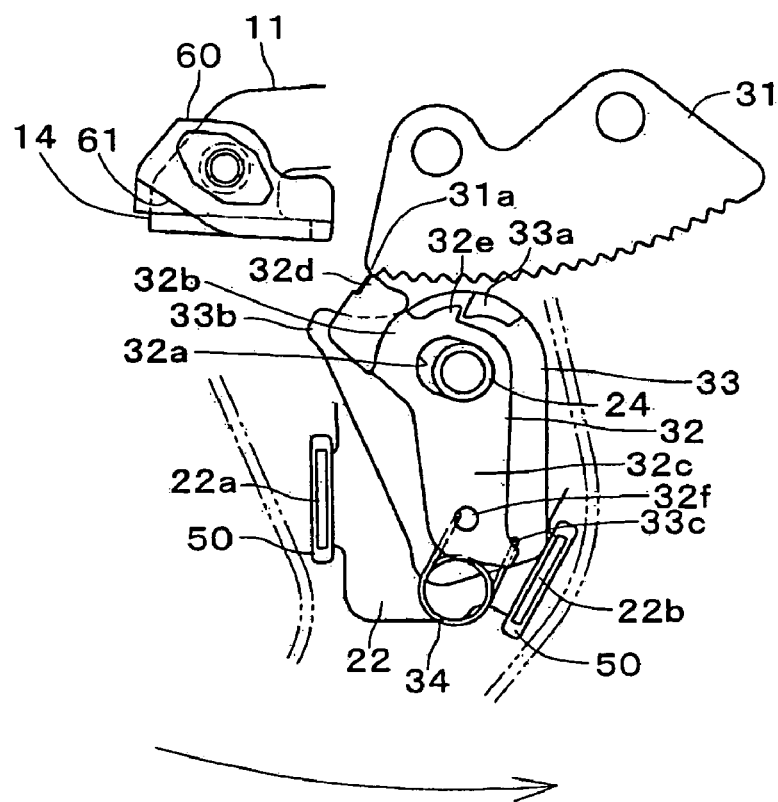
FIG. 4 is another operation explanatory view showing the state that an engaging claw of a pole shown in FIG. 1 is in abutting on latchet teeth.
Figure 5:
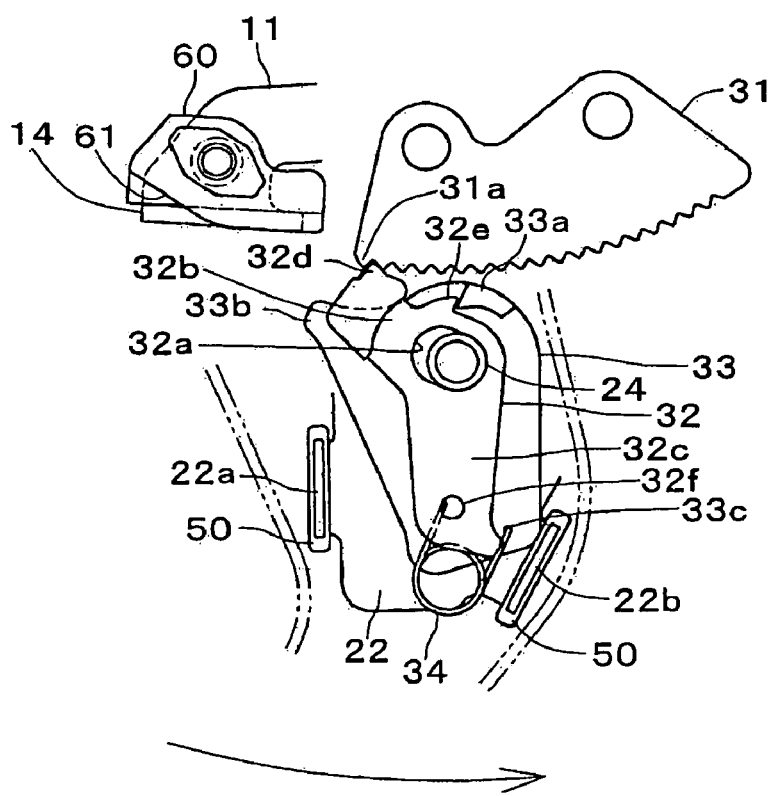
FIG. 5 is another operation explanatory view showing the state that the engaging claw of the pole shown in FIG. 1 is in meshing with the latchet teeth.
Figure 6:
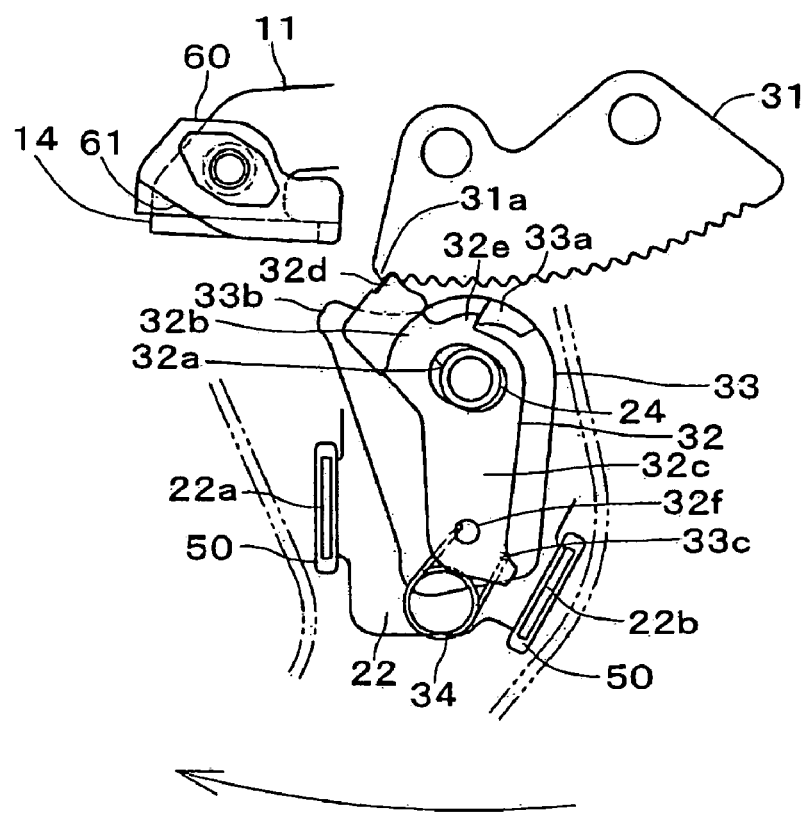
FIG. 6 is another operation explanatory view showing the state that the stepping is released with the engaging claw of the pole shown in FIG. 1 being in meshing with the latchet teeth.

When the driver further steps the pedal pad 25 to further turn the pedal arm 20, the pole 32 is pivoted slightly counterclockwise as the engaging claw 32*d* of the pole 32 goes up on a first tooth of the ratchet teeth 31*a* (refer to FIG. 4). Then, the pole 32 is pivoted slightly clockwise as the engaging claw 32*d* of the pole 32 goes down on the first tooth of the ratchet teeth 31*a* (refer to FIG. 5).

When the driver releases the pedal pad 25 with the brake mechanism operating sufficiently, the pedal arm 20 is pivoted clockwise by the urging force of the return spring and the drawing force acting on the brake cable 40. At this time, the engaging claw 32*d* bites the ratchet teeth 31*a*. The second shaft pin 24 is pivoted clockwise with the pivot movement of the pedal arm 20. This pivot movement of the second shaft pin 24 causes the pole 32 to pivot clockwise about a fulcrum of the biting point and also causes the second shaft pin 24 move toward the left end of the elongate hole 32*a* (refer to FIG. 6).

Further, with the pivot movement of the pedal arm 20, the second shaft pin 24 reaches the second slide position where it comes to abutting on the left end of the elongate hole 32*a* (refer to FIG. 7). At this time, the second shaft pin 24 pressures the pole 32 upon the ratchet plate 31 by the resultant of the urging force of the return spring and the drawing force of the brake cable 40 which are acting on the pedal arm 20. With this pressuring force, the engaging claw 32*d* and the ratchet teeth 31*a* are kept engaged firmly. Thus, the parking brake works with the pedal arm 29 being locked at the position shown in FIG. 7. As the pedal arm 20 is moved slightly from the state shown in FIG. 6 to the state shown in FIG. 7, the pole 32 is pivoted clockwise while being slidden to push the release lever abutting portion 33*a* at the pole abutting portion 32*e*, and thus, the release lever 33 is also pivoted clockwise. At this time, the hook hole 33*c* engaging the other end of the spring 34 is positioned on the left side of the hook hole 32*f* engaging the one end of the spring 34, whereby the spring 34 is turned over from the first position to the second position. As a consequence, the release lever 33 is pivoted clockwise by the urging force of the spring 34 and is stopped upon abutting on the left side wall 22a.

When the driver steps on the pedal pad 25 again to release the locking of the pedal arm 20 with the foot-operated parking brake device for vehicles being in the parking brake operating state, the pedal arm 20 is pivoted counterclockwise from the state shown in FIG. 7. As a result, the engaging claw 32d is disengaged from the ratchet teeth 31a, and the pole 32 is pivoted counterclockwise by the urging force of the spring 34 being in the second position, to be stopped upon abutting on the right side wall 22b (refer to FIG. 8). This brings the lock mechanism 30 into the second state.

Then, as the driver relaxes the stepping force being exerted on the pedal pad 25, the pedal arm 20 is pivoted clockwise by the urging force of the return spring to return from the parking brake operating position toward the original position (the sate shown in FIG. 2). First of all, as shown in FIG. 9, the abutting protrusion 33b of the release lever 33 comes into abutting on the spring returning portion 14 of the mounting bracket 11. As the pedal arm 20 is pivoted further, the abutting protrusion 33b is pushed by the spring returning portion 14 to pivot the release lever 33 counterclockwise. Thus, the hook hole 33c engaging the other end of the spring 34 comes close to the hook hole 32f engaging the one end of the spring 34 (refer to FIG. 10). As the pedal arm 20 is pivoted further, the release lever 33 is further pivoted counterclockwise, whereby the hook hole 33c engaging the other end of the spring 34 further comes close to the hook hole 32f engaging the one end of the spring 34. Therefore, the pole 32 is moved up (to the first slide position) by the urging force of the spring 34 (refer to FIG. 11).

Figure 12:
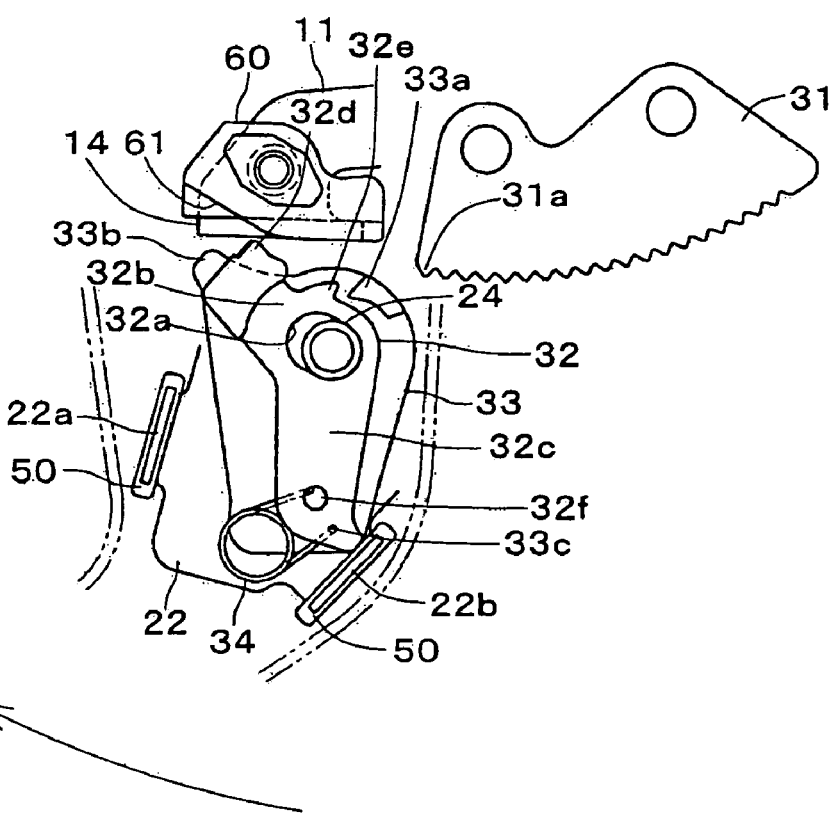
FIG. 12 is another operation explanatory view showing the state that the spring is immediately before being returned from the second portion shown in FIG. 9 to the first position.

As the further pivot movement of the pedal arm 20 causes the release lever 33 to pivot further counterclockwise, the sliding of the pole 32 to the first slide position results in separating the pole abutting portion 32e and the release lever abutting portion 33a away from each other as well as in bringing the hook hole 33c engaging the other end of the spring 34 into the right side of the hook hole 32f engaging the one end of the spring 34 (refer to FIG. 12). This returns the spring 34 from the second position to the first position. As a consequence, the pole 32 and the release lever 33 are pivoted by the urging force of the spring 34 being in the first position in pivot directions which make the pole abutting portion 32e and the release lever abutting portion 33a come close to each other, whereby the pole abutting portion 32e and the release lever abutting portion 33a which were in separation so far come close to each other with great force.

Figure 13:
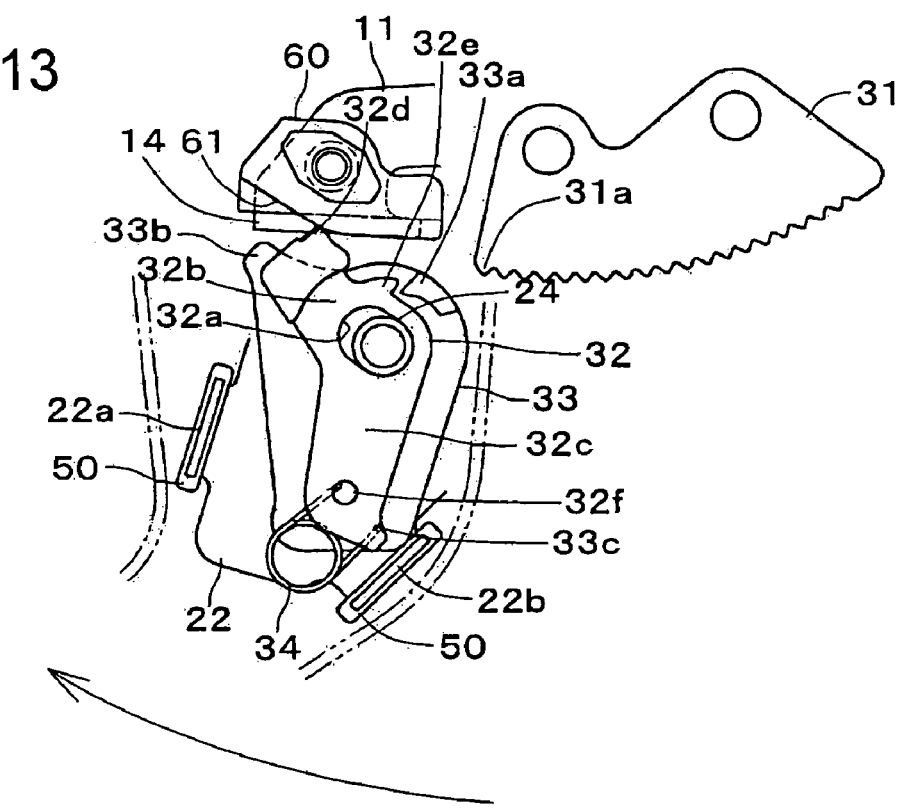
FIG. 13 is another operation explanatory view showing the state that the engaging claw of the pole shown in FIG. 1 is in abutting on a shock absorbing member.

At this moment, the engaging claw 32d of the pole 32 is brought into abutting on the shock absorbing member 60, as shown in FIG. 13. The abutting surface 61 of the shock absorbing member 60 is formed to bring the lock mechanism 30 into the first state at least before the pedal arm 20 reaches, from the original position, the abutting position where the engaging claw 32d of the pole 32 comes into abutting on the ratchet teeth 31a, and to form the space between the pole abutting portion 32e and the release lever abutting portion 33a until the lock mechanism 30 is brought into the first state. Accordingly, the pivot movement of the pole 32 is restrained immediately before the pole abutting portion 32e and the release lever abutting portion 33a which were in separation so far come into collision as a result of being pivotally urged by the spring 34. Thereafter, the pedal arm 20 is returned to the original position with the space kept between the pole abutting portion 32e and the release lever abutting portion 33a.

As is clear from the foregoing description, in the present embodiment, the spring 34 is also returned from the second position to the first position when the lock mechanism 30 is returned from the second state to the first state to unlock the pedal arm 20 being locked. Before this returning, the pole 32 and the release lever 33 remaining in the second state have been pivoted by the urging force of the spring 34 being in the second position in the pivot directions to make the pole abutting portion 32e and the release lever abutting portion 33a separate from each other, and thus, the pole abutting portion 32e and the release lever abutting portion 33a have been separated with the space therebetween. However, with the returning of the spring 34 to the first position, the pole 32 and the release lever 33 are pivoted by the urging force of the spring 34 being in the first position in the pivot directions to make the pole abutting portion 32e and the release lever abutting portion 33a come close to each other, and thus, the pole abutting portion 32e and the release lever abutting portion 33a having been separated so far come close with great force. At this moment, the engaging claw 32d of the pole 32 which is another part different from the pole abutting portion 32e comes into abutting on the shock absorbing member 60 with the shock being absorbed. The abutting surface 61 of the shock absorbing member 60 is formed to bring the lock mechanism 30 into the first state at least before the pedal arm 20 reaches, from the original position, the abutting position where the engaging claw 32d of the pole 32 is brought into abutting on the ratchet teeth 31d, and to provide the space between the pole abutting portion 32e and the release lever abutting portion 33a until the lock mechanism 30 is brought into the first state. Therefore, by restricting the pivot movement of the pole 32 immediately before the pole abutting portion 32e and the release lever abutting portion 33a having been in separation are brought into collision by being pivoted by the urging force of the spring 34, the pole abutting portion 32e and the release lever abutting portion 33a can be prevented from generating the collision noise, so that it can be realized to diminish the unnecessary noise in the manipulation of the pedal arm 20.

In addition, the spring returning portion 14 is further provided which is arranged to cause the release lever 33 to be pivoted upon abutting thereon when the lock mechanism 30 is returned from the second state to the first state, for making the spring 34 return from the second position to the first position with the pivot movement of the release lever 33. Thus, with the simplified construction wherein the shock absorbing member 60 only is attached to the prior art structure to be close to the spring returning portion 14, it can be realized to prevent the pole abutting portion 32e and the release lever abutting portion 33a from generating the collision noise.

Further, since the engaging claw 32d of the pole 32 comes into abutting on the shock absorbing member 60 subsequent to the time point when the spring 34 is returned from the second position to the first position, the portion which is able to reliably prevent the pole abutting portion 32e and the release lever abutting portion 33a from generating the collision noise can be secured to be minimum as required, so that the shock absorbing member 60 can be miniaturized.

Further, since the shock absorbing member 60 is constituted not to be deformed elastically beyond an amount to be required, it can be realized to diminish the collision noise which is generated when the pole 32 is brought into abutting on the shock absorbing member 60, and hence, to reduce the unnecessary noise in the manipulation of the pedal arm 20. Moreover, it can be suppressed as much as possible that the elastic deformation of the shock absorbing member 60 beyond the required amount causes the pole abutting portion 32e come into collision with the release lever abutting portion 33a.

Although in the foregoing embodiment, the predetermined portion except for the pole abutting portion 32e of the pole 32 is taken as the engaging claw 32d, any other portion may be taken as the predetermined portion as so far as it is provided to be able to abut on the shock absorbing member 60.

Further, in the foregoing embodiment, the present invention is applied to the foot-operated parking brake device for vehicles of the construction that the ratchet teeth 31a are provided on the mounting bracket 11 and that the pole 32 and the release lever 33 are provided on the pedal arm 20. Alternatively, the present invention may be applied to a foot-operated parking brake device for vehicles of the construction that the ratchet teeth 31a are provided on the pedal arm 20 and that the pole 32 and the release lever 33 are provided on the mounting bracket 11.

Obviously, numerous modifications and variations of the present invention are possible in light of the above teachings. It is therefore to be understood that within the scope of the appended claims, the present invention may be practiced otherwise than as specifically described herein.

What is claimed is:

1. A foot-operated parking brake device for vehicles comprising a pedal arm attached at one end thereof to a mounting bracket secured to a vehicle body to be pivotable in a vertical plane, the pedal arm being connected at the side of the one end to a parking brake control cable and having a pedal pad attached to the other end thereof; and a lock mechanism for locking the pedal arm when the pedal arm is stepped and for releasing the locking of the pedal arm when the pedal arm is stepped again;

wherein the lock mechanism comprises plural ratchet teeth provided on either one of the mounting bracket and the pedal arm to align along an arc having a center coaxial with a pivot axis of the pedal arm; a pole attached to the other of the mounting bracket and the pedal arm to be pivotable and slidable and having an engaging claw disengageably engaged with the ratchet teeth; a release lever attached to the other of the mounting bracket and the pedal arm to be approximately coaxial with the pole and to be pivotable; a spring for urging the pole and the release lever to pivot in mutually opposite directions; a pole pivot limiting portion and a release lever pivot limiting portion for respectively limiting pivot movements of the pole and the release lever; and a pole abutting portion and a release lever abutting portion formed on the pole and the release lever for respectively limiting pivot movements of the pole and the release lever upon abutting on each other;

wherein before the pedal arm is locked, the lock mechanism is in a first state that the pole and the release lever are kept in abutting on each other not to pivot relatively as a result of being pivoted by the urging force of the spring being in a first position in pivot directions which make the pole abutting portion and the release lever abutting portion come close to each other, thereby to bring the pole abutting portion and the release lever abutting portion into abutting on each other, the spring in the first position urging the pole and the release lever to pivot in the pivot directions which make the pole abutting portion and the release lever abutting portion come close to each other, and that the engaging claw of the pole is kept engageable with the ratchet teeth, wherein after the locking of the pedal arm is released, the lock mechanism is in a second state that the pole and the release lever are kept not to pivot relatively as a result of being pivoted by the urging force of the spring being in a second direction in pivot directions which make the pole abutting portion and the release lever abutting portion go away from each other, thereby to bring the pole and the release lever into abutting respectively on the pole pivot limiting portion and the release lever pivot limiting portion, the spring in the second position urging the pole and the release lever to pivot in the pivot directions which make the pole abutting portion and the release lever abutting portion go away from each other, and that the engaging claw of the pole is released from the state in which the engaging claw of the pole is engageable with the ratchet teeth, wherein there is further provided a shock absorbing member on which a predetermined portion except for the pole abutting portion of the pole is brought into abutting when the pedal arm is moved from an original position where the pedal arm is in abutting on a pedal arm pivot limiting portion without being stepped, to an abutting position where the engaging claw of the pole is brought into abutting on the ratchet teeth; and wherein an abutting surface of the shock absorbing member is formed to bring the lock mechanism into the first state at least before the pedal arm reaches the abutting position and to form a space between the pole abutting portion and the release lever abutting portion until the lock mechanism is brought into the first state.

2. The foot-operated parking brake device for vehicles as set forth in claim 1, wherein a spring returning portion is further provided to pivot the release lever upon abutting thereon when the lock mechanism is returned from the second state to the first state, for making the spring return from the second position to the first position with the pivot movement of the release lever; and wherein the shock absorbing member is provided to be close to the spring returning portion.

3. The foot-operated parking brake device for vehicles as set forth in claim 2, wherein the predetermined portion of the pole comes into abutting on the shock absorbing member subsequent to the time point when the spring is returned from the second position to the first position.

4. The foot-operated parking brake device for vehicles as set forth in claim 1, wherein the shock absorbing member is constituted not to be deformed elastically beyond an amount to be required.

5. The foot-operated parking brake device for vehicles as set forth in claim 2, wherein the shock absorbing member is constituted not to be deformed elastically beyond an amount to be required.

6. The foot-operated parking brake device for vehicles as set forth in claim 3, wherein the shock absorbing member is constituted not to be deformed elastically beyond an amount to be required.

* * * * *